US006761995B2

United States Patent
Uyama et al.

(10) Patent No.: US 6,761,995 B2
(45) Date of Patent: Jul. 13, 2004

(54) COIN-SHAPED BATTERY

(75) Inventors: Takao Uyama, Hirakata (JP); Daisuke Yoshida, Moriguchi (JP); Toshihiko Izumikawa, Moriguchi (JP); Yasushi Hirakawa, Moriguchi (JP); Susumu Yamanaka, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 13 days.

(21) Appl. No.: 10/333,389

(22) PCT Filed: Aug. 9, 2001

(86) PCT No.: PCT/JP01/06883
§ 371 (c)(1),
(2), (4) Date: Jan. 17, 2003

(87) PCT Pub. No.: WO02/13290
PCT Pub. Date: Feb. 14, 2002

(65) Prior Publication Data
US 2003/0186118 A1 Oct. 2, 2003

(30) Foreign Application Priority Data
Aug. 9, 2000 (JP) ........................................ 2000-241680

(51) Int. Cl.⁷ ............................................... H01M 2/02
(52) U.S. Cl. ....................................... 429/171; 429/174
(58) Field of Search .................................. 429/171, 174

(56) References Cited
U.S. PATENT DOCUMENTS 4,166,157 A * 8/1979 McCormick ................. 429/174
4,302,517 A * 11/1981 Dziak .......................... 429/66
4,725,515 A * 2/1988 Jurca .......................... 429/174

FOREIGN PATENT DOCUMENTS

| EP | 1320136 | * 6/2003 | .......... H01M/2/02 |
| JP | 359143282 | * 8/1984 | .......... H01M/12/06 |
| JP | 59-215680 | 12/1984 | |
| JP | 359215679 | * 12/1984 | .......... H01M/12/06 |
| JP | 08-017407 | 1/1996 | |
| JP | 08-241699 | 9/1996 | |
| JP | 09-092240 | 4/1997 | |
| JP | 09-161740 | 6/1997 | |
| JP | 2000-040525 | 2/2000 | |
| JP | 2000-200590 | 7/2000 | |

* cited by examiner

Primary Examiner—Mark Ruthkosky
(74) Attorney, Agent, or Firm—Jordan and Hamburg LLP

(57) ABSTRACT

A coin-shaped battery includes a cathode case (1) having a crimp portion (14) in the periphery of a bottom face (1a), and an anode cap (2) having a flange (6) with an extended portion (7) and a turn-up portion (8). Openings of cathode case (1) and the anode cap (2) are sealed by crimping with a gasket (3) interposed therebetween, so that the gasket (3) is compressed between the crimp portion (14) having a U-shaped cross section, the flange (6), the extended portion (7) and the turn-up portion (8) to effect reliable sealing. Thus, it is possible to disperse a deformation pressure, which is generated by bulge of the cathode case (1) and the anode cap (2) caused with a rise in internal pressure of the battery under severe working conditions such as use under a high temperature. As a result, the coin-shaped battery having improved liquid leakage resistance in the crimped portion is provided.

5 Claims, 4 Drawing Sheets

COIN-SHAPED BATTERY

TECHNICAL FIELD

The present invention relates to a coin-shaped battery having a flat cylindrical shape, and to a coin-shaped battery having a case structure with improved liquid leakage resistance under the circumstances where an excessive thermal stress is applied to the battery, such as under a high temperature.

BACKGROUND ART

Coin-shaped batteries, which are also referred to as button-shaped batteries or flat batteries, are widely used for their small and thin size, in equipment required to have reduced size such as watches and remote automotive entry systems and in the case where long-time use is required such as for memory backup of OA equipment or FA equipment. In addition, the coin-shaped batteries are sometimes used as power sources for various meters under a high temperature.

FIG. 5 is a cross-sectional view showing a coin-shaped battery having a conventional structure. This coin-shaped battery includes a cathode tablet 33 and an anode tablet 32, which are placed in a cathode case 31 so as to be opposed to each other with a separator 34 interposed therebetween. After the cathode case 31 is filled with an electrolyte, an opening of the cathode case 31 is crimped with an anode cap 35 through a gasket 36 interposed therebetween, thereby completing the coin-shaped battery. In the coin-shaped battery having such a conventional structure, liquid leakage sometimes occurs due to continuous use under a high temperature and/or due to a sudden change in temperature. The reason for occurrence of such liquid leakage is as follows. A rise in temperature induces the expansion and/or vaporization of an electrolyte, or the like. When an internal pressure of the battery rises, the anode cap 35 and the cathode case 31, from a normal state shown in FIG. 6, outwardly bulge as in a state shown in FIG. 7. At this point, the force for pushing the gasket 36 up acts on an end of the anode cap 35 to separate the anode cap 35 from the gasket 36. Moreover, a gap is generated between the cathode case 31 and the gasket 36 due to outward bulge of the cathode case 31. Such deformation of a crimped portion is likely to cause the liquid leakage.

In order to prevent such liquid leakage, countermeasures as follows have been implemented: reduction in the amount of an electrolyte filling the cathode case, increase in thickness of the cathode case 31 and the anode cap 35 for preventing the deformation, and the like. In addition, there has been known a method of restraining the deformation of a crimped portion of a cathode case 41 upon rise in internal pressure of a battery, with an indent structure as shown in FIG. 8.

However, with reduction in the amount of the electrolyte filling the cathode case, an energy density per volume of the battery is naturally decreased. When the thicknesses of the cathode case 31 and the anode cap 35 are increased, an internal volume of the battery is reduced, also resulting in reduction in energy density per volume.

The indent structure has a disadvantage in that the force for compressing a gasket 46, which is applied to an anode cap 45 on sealing of an opening, induces the positional offset and the deformation of a washer 48 if an indent width is insufficient. As a result, a bottom of the gasket 46 is not sufficiently compressed. What is worse, the indent structure has another disadvantage in that a shoulder portion of the gasket 46 is not sufficiently compressed because the positional offset and the deformation of the washer 48 cause the displacement of the gasket 46 and the anode cap 45 in an inner diameter direction of the cathode case 41. The positional offset and the deformation of the washer 48 can be restrained by processing the indent width so as to protrude at least up to the center of a turn-up portion of the anode cap 45. With current press techniques, however, it is difficult to stably form a sufficient indent width. The unevenness in indent width thus results in ununiform leakage resistance of the battery.

The present invention has an object of providing a coin-shaped battery having a sealing structure that prevents liquid leakage even upon rise in internal pressure of the battery.

DISCLOSURE OF THE INVENTION

In order to achieve the above object, a coin-shaped battery according to the present invention includes: a cathode case formed so as to have a cylindrical shape with a closed end; and power generating elements housed within the cathode case, the cathode case and an anode cap being crimped with a gasket interposed therebetween, wherein the anode cap having a reversed cylindrical shape with a closed end with respect to the cathode case, includes a flange in its opening, the flange having, on its tip, an extended portion in a cylindrical direction and a turn-up portion upwardly extending from a bent portion corresponding to the lowermost end portion of the extended portion; the cathode case includes, in a periphery of its bottom face, a rising portion having an outer diameter smaller than an inner diameter of the extended portion, and a crimp portion further extending from the rising portion; and the gasket is placed so that its upper portion is compressed between an upper end of the crimp portion, and a tip of the turn-up portion and the flange, and its lower portion is compressed between a step portion of the crimp portion and the bent portion, when the crimping is effectuated.

According to this configuration, when the cathode case bulges due to rise in internal pressure of the battery, a deformation pressure is dispersed by the step portion. When the anode cap bulges, a deformation pressure is dispersed by the flange. Consequently, the deformation of the crimped portion is restrained. The thus sealed battery demonstrates excellent liquid leakage resistance even on the use under a high temperature or the like.

In the above configuration, the rising portion from the bottom face of the cathode case to the step portion is formed upwardly from the bottom face, so that the deformation of the bottom face of the cathode case is restrained from propagating to the crimped portion. Thus, the rising portion is effective to maintain the liquid leakage resistance.

When the step portion is formed so as to have a width in a radius direction of 1.5 mm to 2.5 mm and a height from the bottom face of the cathode case of 0.5 mm to 1.5 mm, it is suitable for restraining the deformation of the cathode case from propagating to the crimped portion.

A height of the tip of the turn-up portion is formed so as to be identical with that of an outer face of the flange or to fall within the range of a thickness of the anode cap. Thereby, the degree of compression of the gasket by the flange and the tip becomes uniform. Thus, when the deformation propagates to the crimped portion, the deformation of the anode cap is restrained, thereby maintaining the functions for preventing the liquid leakage.

Furthermore, in order to restrain the occurrence of liquid leakage due to rise in internal pressure of the battery, the coin-shaped battery of the invention includes a plurality of parts for compressing the gasket so that an excessive compression is not locally applied to the gasket. More specifically, the gasket is compressed by the flange of the anode cap and the tip of the turn-up portion. Even upon rise in internal pressure, excessive compression does not occur at any site. As a result, the rupture and/or breakage of the gasket caused along with excessive compression of the gasket is restrained to prevent the liquid leakage from occurring.

The coin-shaped battery of the invention is preferred to have a structure with enhanced elastic deformability of the gasket. In this configuration, even when a high compressive force is applied to the gasket, the gasket is capable of following the deformation of the anode cap and the cathode case because the gasket can restore its steady state owing to elastic deformation. Thus, the generation of a gap between the gasket and the anode cap/the cathode case is restrained. As a material of the gasket with enhanced elastic deformability, an elastoplastic resin having a tensile yield strength of 40 MPa or higher, or an elastic resin made of a rubber-type elastomer is extremely suitable. The use of these resin materials allows the minimization of the effects of deformation on the sealing performance even when a thermal stress applied under severe temperature circumstances, in particular, a rise in internal pressure of the battery, induces the deformation of the anode cap and the cathode case. Consequently, the liquid leakage is effectively restrained from occurring.

BEST MODE FOR CARRYING OUT THE INVENTION

Hereinafter, embodiments of the present invention will be described with reference to the accompanying drawing for the sake of understanding of the invention. Incidentally, the embodiment shown below is merely an example of embodiment of the present invention, and by no means intended to limit the technical scope of the invention.

Figure 1:
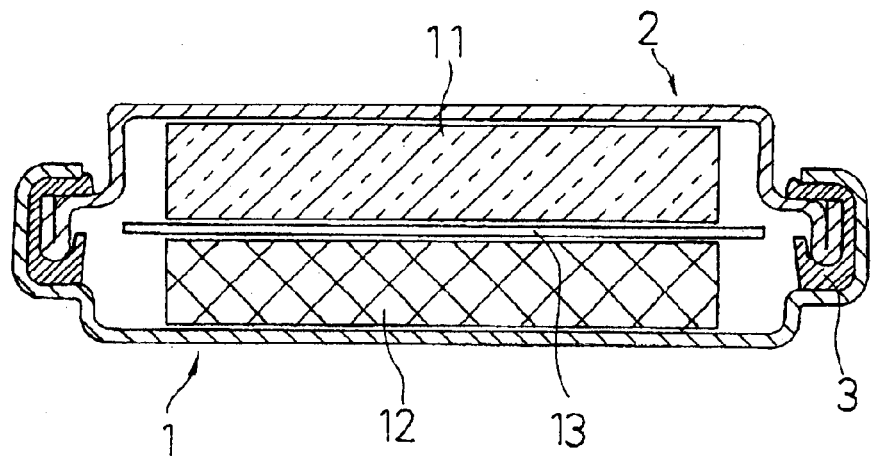
FIG. 1 is a cross-sectional view showing a structure of a coin-shaped battery according to an embodiment of the present invention.

A coin-shaped battery according to this embodiment includes, as shown in FIG. 1, a cathode tablet 11 and an anode tablet 12 which are placed in a cathode case 1 having a shallow cylindrical shape with a closed end so as to be opposed to each other with a separator 13 interposed therebetween. After the cathode case 1 is filled with an electrolyte, an anode cap 2 is placed over an opening of the cathode case 1 with a gasket 3 interposed therebetween. The opening is crimped with the anode cap 2 to constitute the coin-shaped battery.

Figure 3:
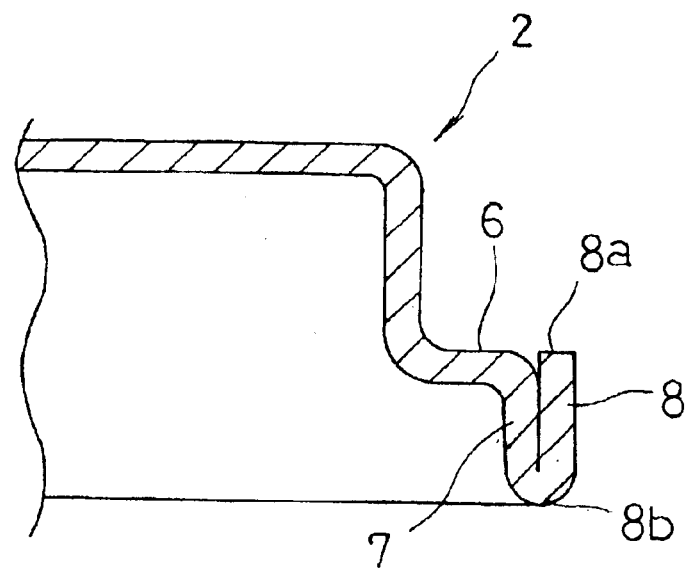
FIG. 3 is a partial cross-sectional view showing an anode cap of the coin-shaped battery according to the embodiment.
Figure 4:
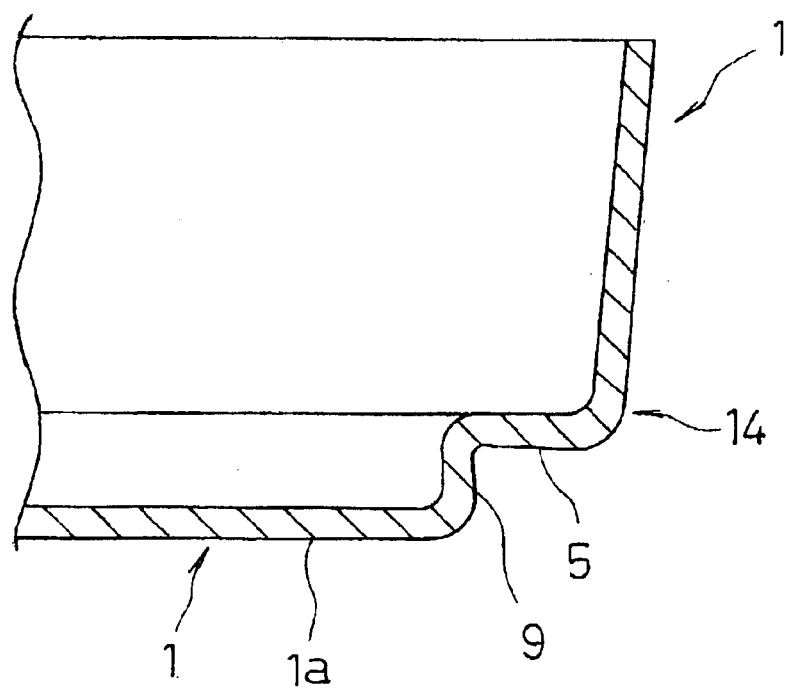
FIG. 4 is a partial cross-sectional view showing a cathode case of the coin-shaped battery according to the embodiment.

The cathode case 1 has a cylindrical shape with a closed end, as shown in FIG. 4. In the periphery of a bottom face 1a, a rising portion 9, which is formed upwardly from the bottom face 1a, and a crimp portion 14 extending from the rising portion 9 are formed. The anode cap 2 is formed to have a reversed cylindrical shape with a closed end with respect to the cathode case 1, as shown in FIG. 3. A flange 6 is formed on the side of an opening end. On the side of a tip of the flange 6, an extended potion 7 extending in a cylindrical direction, a bent portion 8b corresponding to the lowermost end portion of the extended portion 7, and a turn-up portion 8 upwardly extending from the bent portion 8b in close contact with the extended portion 7, are formed. Reference numeral 8a represents a tip of the turn-up portion 8.

Figure 2:
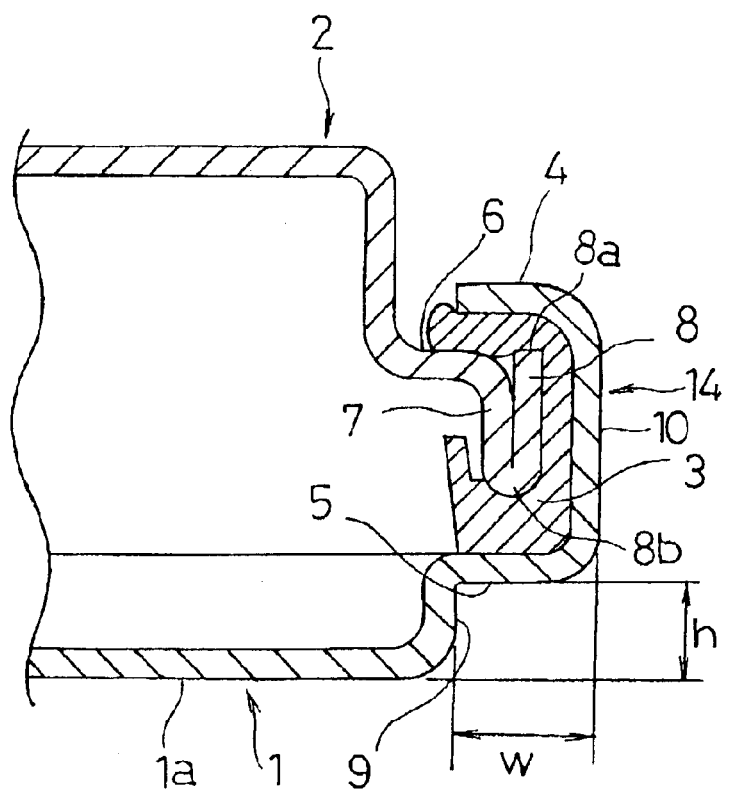
FIG. 2 is an enlarged cross-sectional view showing a crimped portion of the coin-shaped battery according to the embodiment.

As shown in FIG. 2, the crimp portion 14 of the cathode case 1 includes: a step portion 5 in parallel with the bottom face 1a; a gasket enveloping portion 10 formed vertically in an upward direction from the step portion 5; and an upper end 4 formed from the gasket enveloping portion 10 in an inner diameter direction. The anode cap 2 is placed over the opening of the cathode case 1 while placing the gasket 3 inside the crimp portion 14. The crimping is effectuated in this state, so that the middle portion of the gasket 3 is interposed between the turn-up portion 8 and the gasket enveloping portion 10 in close contact therewith. Then, the lower portion of the gasket 3 is compressed between the step portion 5 and the turn-up portion 8b, whereas the upper portion is compressed between the tip 8a and the flange 6, and the upper end 4. Thereby, the interior of the battery is sealed.

The thus constituted battery demonstrates excellent liquid leakage resistance even on the use under a high temperature. On the use under a high temperature, the expansion of components within the battery, the evaporation of the electrolyte or the like occurs to increase an internal pressure of the battery, thereby generating the force for outwardly bulging the cathode case 1 and the anode cap 2. In the case of the battery of the present invention, however, since the step portion 5 is formed in the crimp portion 14 of the cathode case 1, the deformation of the cathode case 1 hardly affects the crimped portion, and therefore an inner wall of the step portion 5 and a lower end of the gasket 3 are hardly separated from each other. The rising portion 9, when it is formed upwardly from the bottom face 1a, disperses the force propagating to the step portion 5 even when the bottom face 1a is deformed. Thus, the step portion 5 is restrained from being deformed. Moreover, a deformation pressure on the anode cap 2 is dispersed by the flange 6. In addition, the flange 6 is pressed by the upper end 4 of the cathode case 1 through the gasket 3. Consequently, the force of the deformation pressure for lifting the gasket 3 up acts so as not to generate a gap between the gasket 3 and the crimped portion.

In order to sufficiently obtain the above liquid leakage resistance, the rising portion 9 is formed so as to be situated inside the inner diameter position of the extended portion 7 of the anode cap 2, as shown in FIG. 2. In addition, it is desirable that the tip 8a of the turn-up portion 8 is formed to have the same height position as that of the flange 6. The tip 8a is formed so that its formation accuracy falls at least within the range of a thickness of the anode cap 2.

Regarding the battery having the above configuration, the results of verification of the comparison for liquid leakage resistance between a battery having a conventional structure and a battery having an indent structure and the comparison for liquid leakage resistance over a structural change of the battery according to this embodiment will be described below.

The battery according to this embodiment was fabricated in the following manner. As shown in FIG. 1, in the cathode case 1 formed by using SUS 444, the cathode tablet 11, which is formed by mixing a conductive agent such as graphite and a binder with polycarbon monofluoride, and the anode tablet 12, which is formed of metal lithium, are placed so as to be opposed to each other with the separator 13 formed of a polyphenylene sulfide non-woven fabric interposed therebetween. Then, the cathode case is filled with a nonaqueous electrolyte having a heat resistance of 150° C. and higher. Thereafter, a sealing agent made of blown asphalt and a mineral oil is applied between the gasket 3 made of polyphenylene sulfide (hereinafter, also referred to as PPS) and the anode cap 2 made of SUS 304. The gasket 3 and the anode cap 2 are placed over the opening of the cathode case 1 to effectuate the crimping, thereby fabricating a coin-shaped battery. The thus fabricated battery has a diameter of 24.5 mm, a thickness of 7.7 mm, and an electric capacity of 1000 mAh.

(Verification 1)

Figure 5:
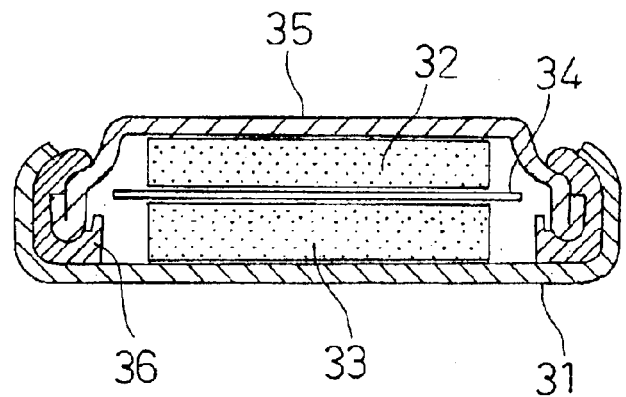
FIG. 5 is a cross-sectional view showing a configuration of a coin-shaped battery having a conventional structure.
Figure 6:
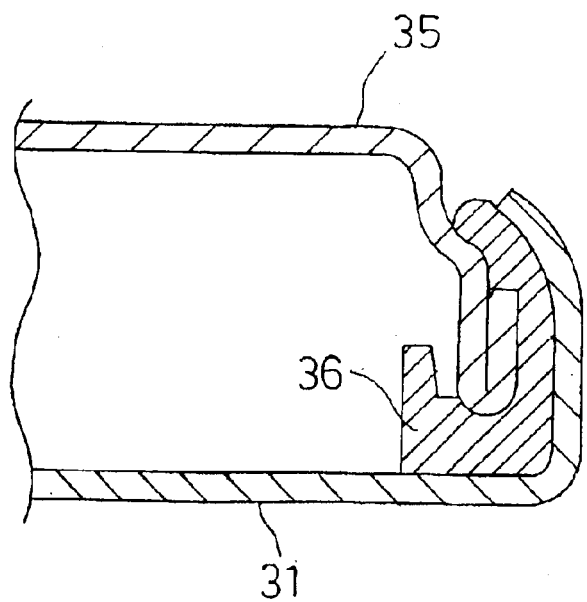
FIG. 6 is a cross-sectional view showing a crimped portion of the conventional coin-shaped battery.
Figure 7:
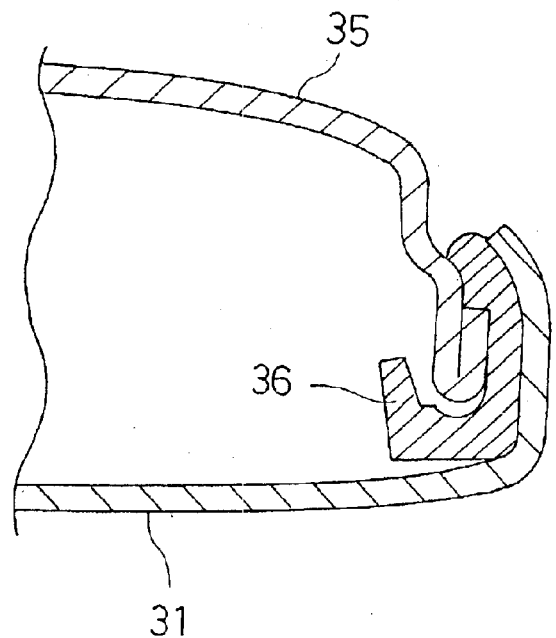
FIG. 7 is a partial cross-sectional view showing a deformed state of the crimped portion of the conventional coin-shaped battery upon rise in internal pressure of the battery.
Figure 8:
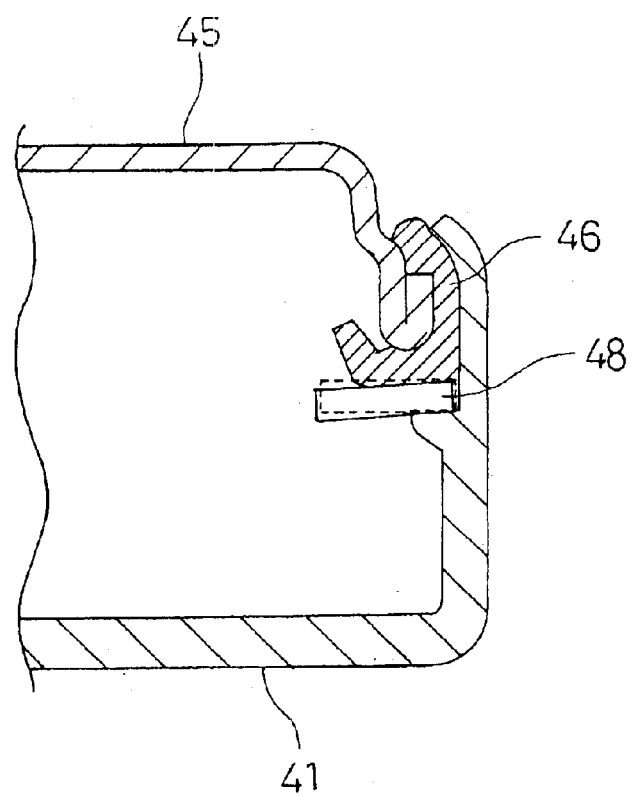
FIG. 8 is a partial cross-sectional view showing a coin-shaped battery having an indent structure.

One hundred batteries for each of batteries A, B and C were fabricated, where the battery A corresponded to a battery according to this embodiment, the battery B was a battery having an indent structure shown FIG. 8, and the battery C was a battery having a conventional structure shown in FIG. 5, the batteries B and C being comparative samples. All the batteries were constituted as coin-shaped polycarbon monofluoride lithium batteries.

As a liquid leakage resistance test, a thermal shock test was conducted for 100 cycles: after leaving a test sample under the condition at 85° C. for one hour, the test sample was left under the condition at −20° C. for another one hour. Then, the number of occurrences of liquid leakage from the cathode case side and that from the anode cap side were visually inspected. The results of the test are shown in Table 1.

TABLE 1

| Liquid leakage resistance test | Battery A | Battery B | Battery C |
|---|---|---|---|
| Number of occurrences of liquid leakage from cathode case side | 0/100 | 4/100 | 14/100 |
| Number of occurrences of liquid leakage from anode cap side | 0/100 | 5/100 | 12/100 |

The liquid leakage from the cathode case side occurs due to generation of a gap between the cathode case and the gasket. It is understood that the occurrence of liquid leakage is remarkably restrained in the batteries A and B as compared with the battery C having a conventional structure. The subsequent cross-sectional analysis has proven that the liquid leakage in the battery B having an indent structure is caused by unevenness in width of a protrusion described above. The liquid leakage from the anode cap side is due to generation of a gap between the anode cap and the gasket. It is understood that the occurrence of liquid leakage from the anode cap side is remarkably restrained in the batteries A and B as compared with the battery C having a conventional structure.

(Verification 2)

The polycarbon monofluoride lithium batteries (diameter: 24.5 mm, thickness: 7.7 mm, electric capacity: 1000 mAh) according to the above-described embodiment were fabricated while varying:(1) a height position of the tip 8a of the turn-up portion 8; (2) a height (h) from the bottom face 1a of the cathode case 1 to the step portion 5; and (3) a width (w) of the step portion 5. Then, the fabricated batteries were tested for the liquid leakage resistance so as to verify the optimal structure. One hundred batteries were fabricated for each type of the batteries, with a fixed amount of the electrolyte filling the battery. As the liquid leakage resistance test, a thermal shock test was conducted for 100 cycles: after leaving a test sample under the condition at 85° C. for one hour, the test sample was left under the condition at −20° C. for another one hour. Then, the number of occurrences of liquid leakage from the cathode case side and that from the anode cap side were visually inspected. Since the number of occurrences of liquid leakage for the battery A is the same as that shown in Table 1, the results thereof are omitted from Tables 3, 5 and 7.

TABLE 2

| | Battery D | Battery E | Battery A | Battery F | Battery G |
|---|---|---|---|---|---|
| Height position of tip | (flange + plate thickness) | (flange + half of plate thickness) | (flange) | (flange − half of plate thickness) | (flange − plate thickness) |
| Height from bottom face | 1.0 mm | 1.0 mm | 1.0 mm | 1.0 mm | 1.0 mm |
| Width of step portion | 2.0 mm | 2.0 mm | 2.0 mm | 2.0 mm | 2.0 mm |

(1) Only a height position of the tip 8a of the turn-up portion 8 from the flange 6 was varied as shown in Table 2 while setting a width w of the step portion 5 of the cathode case 1 to 2.0 mm and a height h from the bottom face 1a of the cathode case 1 to the step portion 5 to 1.0 mm. In each battery, a thickness of the anode cap 2 of the polycarbon monofluoride lithium battery, which is used in the embodiment of the present invention, is formed to 0.25 mm. The results of the liquid leakage resistance test are shown in Table 3. The liquid leakage from the anode cap side occurred in some of the batteries D and G. The liquid leakage in these batteries was due to a level difference which was generated with respect to the position of the flange 6: unevenness in height of flange 6 and the tip 8a results in a difference in degree of compression on the gasket 3. Consequently, the tip 8a of the turn-up portion 8 is formed so as to have the same height position as the outer face position of the flange 6, thereby obtaining the best liquid leakage resistance.

TABLE 3

| Liquid leakage resistance test | Battery D | Battery E | Battery F | Battery G |
|---|---|---|---|---|
| Number of occurrences of liquid leakage from cathode case side | 0/100 | 0/100 | 0/100 | 0/100 |
| Number of occurrences of liquid leakage from anode cap side | 2/100 | 0/100 | 0/100 | 3/100 |

TABLE 4

| | Battery | | | | | | |
|---|---|---|---|---|---|---|---|
| | H | J | K | A | L | M | N |
| Height position of tip | | | | (flange) | | | |
| Height from bottom face | 1.75 mm | 1.5 mm | 1.25 mm | 1.0 mm | 0.75 mm | 0.5 mm | 0.25 mm |
| Width of step portion | 2.0 mm | 2.0 mm | 2.0 mm | 2.0 mm | 2.0 mm | 2.0 mm | 2.0 mm |

(2) The results of the liquid leakage resistance test are shown in Table 5, where only the height h from the bottom face 1a of the cathode case 1 to the step portion 5 was varied while the tip 8a of the turn-up portion 8 was formed to have the same height position as the outer face position of the flange 6 and the width w of the step portion 5 was formed to 2 mm, as shown in Table 4. The liquid leakage from the cathode case side occurred in some of the batteries H and N. An internal pressure rise test (expansion test) by means of compressed air, which was separately conducted, has proven that the batteries H and N have a larger degree of deformation in the crimped portion of the cathode case 1 as compared with the batteries A, J, K, L and M. The reason for this is considered to be because a deformation pressure is not well distributed when the internal pressure rises, failing to sufficiently restrain the displacement of the crimped portion of the cathode case 1. Thus, a suitable height h from the bottom face 1a of the cathode case 1 to the step portion 5 is 0.5 mm or more and 1.5 mm or less in the case of the battery having the structure of the present invention.

TABLE 5

| Liquid leakage resistance test | Battery H | Battery J | Battery K | Battery L | Battery M | Battery N |
|---|---|---|---|---|---|---|
| Number of occurrences of liquid leakage from cathode case side | 1/100 | 0/100 | 0/100 | 0/100 | 0/100 | 2/100 |
| Number of occurrences of liquid leakage from anode cap side | 0/100 | 0/100 | 0/100 | 0/100 | 0/100 | 0/100 |

TABLE 6

| | Battery | | | | | |
|---|---|---|---|---|---|---|
| | O | P | A | Q | R | S |
| Height position of tip | | | (flange) | | | |
| Height from bottom face | 1.0 mm | 1.0 mm | 1.0 mm | 1.0 mm | 1.0 mm | 1.0 mm |
| Width of step portion | 3.0 mm | 2.5 mm | 2.0 mm | 1.5 mm | 1.25 mm | 0.5 mm |

(3) The results of the liquid leakage resistance test are shown in Table 7, where only the width w of the step portion 5 was varied while the tip 8a of the turn-up portion 8 was formed to have the same height position as the outer face position of the flange 6 and the height h from the bottom face 1a of the cathode case 1 to the step portion 5 was formed to 1 mm, as shown in Table 6. The liquid leakage from the cathode case side occurred in some of the batteries O. A separately conducted internal pressure rise test by means of compressed air has proven that the batteries O have a large degree of deformation in the crimped portion of the cathode case 1 as in the precedent test. It is considered that this large degree of deformation is caused because a deformation pressure is not well distributed when the internal pressure rises, failing to sufficiently restrain the displacement of the crimped portion of the cathode case 1. The liquid leakage from the cathode case side and the anode cap side occurred in the batteries R and S. The cross section analysis has proven that an insufficient width w of the step portion 5 caused the slippage of the gasket 3 from the step portion 5, resulting in insufficient compression of the upper portion and the lower portion of the gasket 3. Moreover, it is believed that unevenness in the degree of compression of the gasket 3 prevents the stable sealing of the opening, leading to liquid leakage. Thus, it is suitable that the width w of the step portion 5 is formed from the outer diameter of the cathode case 1 to be beyond the inner diameter position of the extended portion 7.

TABLE 7

| Liquid leakage resistance test | Battery O | Battery P | Battery Q | Battery R | Battery S |
|---|---|---|---|---|---|
| Number of occurrences of liquid leakage from cathode case side | 2/100 | 0/100 | 0/100 | 2/100 | 4/100 |
| Number of occurrences of liquid leakage from anode cap side | 0/100 | 0/100 | 0/100 | 1/100 | 1/100 |

(Verification 3)

The gaskets of the polycarbon monofluoride lithium batteries (diameter: 24.5 mm, thickness: 7.7 mm, and electric capacity: 1000 mAh) according to the above-described embodiment were fabricated using elastoplastic resins and elastomers having different tensile yield strengths. The liquid leakage resistance was tested for the gaskets with the battery A made by using polyphenylene sulfide (PPS) so as to carry out the verification regarding the gasket materials.

The elastic deformability with respect to a compressive force can be generally evaluated by its compressive yield strength. However, the criteria for the compressive yield strength is not common as compared with the other mechanical characteristics, and thus the data for the compressive yield strength is not easily obtainable from the documents and the like. Accordingly, the inventors of the present invention have focused on the tensile yield strength which is easily examinable among the data regarding the material physical properties, and examined the characteristics required for the gasket based on the correlation between the tensile yield strength and the compressive yield strength in a resin material. It is known that the behavior of pressure-distortion upon compression can be approximated from the behavior of pressure-distortion on tension and a Poisson's ratio (ratio of a modulus of longitudinal elasticity to a modulus of transverse elasticity). As a result of a more detailed examination, the present inventors have found that, since a resin material generally exhibits a Poisson's ratio of 0.3, demonstrating an approximately fixed value even in consideration of various factors such as the type of a material, a compressive yield strength can be estimated from a tensile yield strength.

As described above, in the present invention, the physical properties of the gasket is defined based on the tensile yield strength. As a result of the examination of a compressive pressure and the like applied to the gasket upon rise in internal pressure, the present inventors have found that a gasket having a tensile yield strength of 40 MPa or higher is preferred in the case where the structure of the coin-shaped battery according to the present invention is employed and an elastoplastic resin is used for the gasket.

As batteries according to this embodiment using a gasket having a tensile yield strength of 40 MPa or higher, in addition to a battery T using polypropylene (PP) having an improved tensile yield strength by being filled with glass fibers (hereinafter, referred to as modified polypropylene (PP)) and a battery U using a perfluoroalkoxy (PFA) resin which is an elastomer, batteries V, W and X using polypropylene (PP) and high density polyethylene (PE) are fabricated as comparative samples. The gasket materials of the fabricated batteries and their compressive strengths are shown in Table 8. Although modified PP was used for the battery V as for the battery T, the battery V and the battery T have different tensile yield strengths because they differ in the amount of filling glass fibers. Since a perfluoroalkoxy (PFA) resin demonstrates elastic properties without any yield point, its tensile yield strength is not represented as a numerical value in Table 8.

TABLE 8

| | Battery A | Battery T | Battery U | Battery V | Battery W | Battery X |
|---|---|---|---|---|---|---|
| Gasket material | PPS | Modified PP | PFA | Modified PP | PP | PE |
| Tensile yield strength (MPa) | 66 | 43 | — | 38 | 35 | 28 |

As a liquid leakage resistance test, a thermal shock test was conducted for 100 cycles: after leaving a test sample under the condition at 85° C. for one hour, the test sample was further left under the condition at −20° C. for another one hour. Then, the number of occurrences of liquid leakage from the cathode case side and the number of occurrences of liquid leakage from the anode cap side were visually inspected. The results of the test are shown in Table 9.

TABLE 9

| Liquid leakage resistance test | Battery A | Battery T | Battery U | Battery V | Battery W | Battery X |
|---|---|---|---|---|---|---|
| Number of occurrences of liquid leakage from cathode case side | 0/100 | 0/100 | 0/100 | 0/100 | 0/100 | 0/100 |
| Number of occurrences of liquid leakage from anode cap side | 0/100 | 0/100 | 0/100 | 0/100 | 0/100 | 0/100 |

As is apparent from Table 9, the occurrence of liquid leakage was not observed in any battery. Thus, against the application of a thermal stress through alternate placement under the conditions at 85° C. and −20° C., it is confirmed that liquid leakage is restrained by using the structure of the coin-shaped battery according to the present invention.

Next, one hundred batteries were fabricated again for each type of the batteries, with a fixed amount of filling as in the above examinations. A thermal shock test was conducted for 100 cycles: after leaving a test sample under the condition at 125° C. for one hour, the test sample was left under the condition at −40° C. for another one hour. The number of occurrences of liquid leakage from the cathode case side and the number of occurrences of liquid leakage from the anode cap side were visually inspected. The results of the test are shown in Table 10.

TABLE 10

| Liquid leakage resistance test | Battery A | Battery T | Battery U | Battery V | Battery W | Battery X |
|---|---|---|---|---|---|---|
| Number of occurrences of liquid leakage from cathode case side | 0/100 | 0/100 | 0/100 | 1/100 | 7/100 | 30/100 |
| Number of occurrences of liquid leakage from anode cap side | 0/100 | 0/100 | 0/100 | 1/100 | 5/100 | 18/100 |

Under the conditions at −40 to 125° C., the effects of a thermal stress become remarkable to prevent the batteries from maintaining their sealing performance. Thus, the occurrence of liquid leakage was observed even in the batteries V, W and X in which the liquid leakage was not observed under the conditions at −20 to 85° C., as shown in Table 10. The reason for the occurrence of liquid leakage is as follows. The anode cap and the cathode case are deformed with a rise in internal pressure of the battery. The deformation of the gasket, which follows the deformation of the anode cap and the cathode case, exceeds the elastic region to reach the plastic region due to the effects of an excessive thermal stress. When the deformation of the gasket reaches the plastic region, the gasket does not restore its initial form any longer. Thus, the gasket is not capable of following the deformation of the anode cap and the cathode case upon drop in internal pressure of the battery, resulting in a factor of causing the liquid leakage.

In the batteries A and T including the gasket formed by using polyphenylene sulfide and modified polypropylene having a tensile yield strength of 40 MPa or higher, however, no liquid leakage was observed. In the gasket formed by using a polyphenylene sulfide resin, in particular, no deterioration in the sealing properties was observed even under the circumstance at about 120° C. However, the liquid leakage was observed in the battery V using modified polypropylene as in the battery T. This result shows that a tensile yield strength of 40 MPa or higher makes a difference in liquid leakage resistance. The examination of a cross section of the battery after the liquid leakage test shows the generation of gaps at a contact face between the anode cap and the gasket and at a contact face between the cathode case and the gasket due to contraction deformation of the gasket. The contraction deformation is caused by a rise in internal pressure of the battery. It is assumed that the liquid leakage occurs through the thus generated gaps.

Furthermore, no liquid leakage was observed in the battery U using a perfluoroalkoxy resin, an elastomer. It is verified that the occurrence of liquid leakage due to compressive deformation can be prevented by using an elastomer having a rubber-like elasticity for the gasket. Since a rubber-type material does not have a plastic deformation range, such a material is suitable in view of the ability of following the compressive deformation of the anode cap and the cathode case. Among others, a perfluoroalkoxy (PFA) resin is suitable also in view of stability with respect to an organic electrolyte and thermal stability.

It is apparent that the effects of the present invention are not limited to the combinations in the above-described embodiment; the similar effects can be obtained in cells and rechargeable batteries fabricated by the combination of various positive and negative electrode materials.

INDUSTRIAL APPLICABILITY

According to the present invention, the coin-shaped battery has a structure in which a bottom face downwardly bulges by providing a step portion in the periphery of the bottom face of a cathode case to increase a volume of the cathode case. Moreover, such a structure allows a discharge capacity to be increased while improving the liquid leakage resistance as compared with a known coin-shaped battery. Accordingly, the coin-shaped battery of the present invention does not need to be frequently replaced, and is useful in view of the environmental aspects such as reduction in the amount of waste batteries.

Moreover, by using an elastoplastic resin having a tensile yield strength of 40 MPa or higher, or an elastomer for a gasket, in particular, the coin-shaped battery of the present invention has remarkably improved liquid leakage resistance even under severe working conditions such as on the use in a tire pressure monitoring system for a vehicle and on the use under a high temperature. Consequently, the coin-shaped battery of the present invention is useful to extend the range of application as compared with conventional batteries.

What is claimed is:

1. A coin-shaped battery comprising:
    a cathode case formed so as to have a cylindrical shape with a closed end;
    power generating elements housed in the cathode case; and
    an anode cap provided on an opening of the cathode case with a gasket interposed therebetween, the opening of the cathode case being sealed by crimping, wherein
    the anode cap having a reversed cylindrical shape with a closed end with respect to the cathode case, includes a flange in an opening thereof, the flange having, on a tip thereof, an extended portion in a cylindrical direction and a turn-up portion of the extended portion;
    the cathode case includes a rising portion, formed upwardly from a bottom face thereof so as to have an outer diameter smaller than an inner diameter of the extended portion in a periphery of the bottom face, and a crimp portion further extending from the rising portion; and
    the gasket is placed so as to be compressed between the crimp portion having a U-shaped cross section, the flange, the extended portion and the turn-up portion when the crimping is effectuated.

2. A coin-shaped battery comprising:
    a cathode case formed so as to have a cylindrical shape with a closed end; and
    power generating elements housed in the cathode case and an anode cap formed so as to have a cylindrical shape with a top, an opening of the cathode case and an opening of the anode cap being sealed by crimping with a gasket interposed therebetween, wherein
    the anode cap includes: a flange formed so as to be horizontal to the top of the anode cap in a periphery of the opening; an extended portion downwardly formed in a vertical direction with respect to the top of the anode cap in a periphery of the flange; a bent portion corresponding to a vertical lowermost end portion of the extended portion; and a turn-up portion extending upwardly in a vertical direction from the bent portion so as to be in close contact with the extended portion;
    the cathode case includes a rising portion, formed upwardly from a bottom face thereof so as to have an outer diameter smaller than an inner diameter of the extended portion in a periphery of the bottom face, and a crimp portion further extending from the rising portion;
    the crimp portion includes: a step portion formed in an outer diameter direction, in parallel with the bottom face of the cathode case; a gasket enveloping portion formed upwardly in a periphery of the step portion in a vertical direction with respect to the bottom face so as to be longer than the extended portion; and an upper end formed on a tip of the gasket enveloping portion in an inner diameter direction, in parallel with the bottom face; and
    the gasket is placed so that a middle portion of the gasket is interposed between the gasket enveloping portion and the turn-up portion in close contact therewith, an upper portion is compressed between a tip of the turn-up portion, and the flange and the upper end, and a lower portion is compressed between the bent portion and the step portion when the crimping is effectuated.

3. The coin-shaped battery according to claim 2, wherein the step portion is formed so as to have a width in a radius direction of 1.5 mm to 2.5 mm and a height from the bottom face (1a) of the cathode case of 0.5 mm to 1.5 mm.

4. The coin-shaped battery according to any one of claims 1 and 2, wherein a height position of the tip is formed so as to be identical with that of an outer face of the flange or to fall within a range of a thickness of the anode cap.

5. The coin-shaped battery according to any one of claims 1 and 2, wherein the gasket is made of any one of an elastoplastic resin having a tensile yield strength of 40 MPa or higher, and an elastic resin.

* * * * *